United States Patent [19]
White

[11] Patent Number: 5,069,032
[45] Date of Patent: Dec. 3, 1991

[54] GAS TURBINE IGNITION SYSTEM

[75] Inventor: Robert C. White, San Diego, Calif.

[73] Assignee: Sundstrand Corporation, Rockford, Ill.

[21] Appl. No.: 497,700

[22] Filed: Mar. 23, 1990

[51] Int. Cl.⁵ .......... F02C 7/266
[52] U.S. Cl. .......... 60/39.141; 60/39.821
[58] Field of Search .......... 60/39.141, 39.142, 39.821, 60/39.827, 39.828; 290/36 R, 36 A, 37 R, 37 A, 52; 361/258, 259

[56] References Cited

U.S. PATENT DOCUMENTS

| | | | |
|---|---|---|---|
| 2,402,547 | 6/1946 | Gilfillan | 290/36 R |
| 2,613,499 | 10/1952 | Lawter | 60/39.14 |
| 3,049,879 | 8/1962 | Clark | 60/39.141 |
| 3,138,924 | 6/1964 | Lawser | 60/39.141 |
| 3,465,162 | 9/1969 | Oprecht | 60/39.141 |
| 4,425,812 | 1/1984 | Williams | 74/6 |
| 4,645,940 | 2/1987 | Wertheim | 307/66 |

*Primary Examiner*—Louis J. Casaregola
*Attorney, Agent, or Firm*—Antonelli, Terry, Stout & Kraus

[57] ABSTRACT

A gas turbine ignition system (40) in accordance with the invention includes a power takeoff (42) coupled to the turbine for providing rotary power upon rotation of a rotor of the turbine; a clutch (48) having an input (46) coupled to the power takeoff and an output (50) which outputs torque applied to the input when the rotor is rotating at a velocity less than a velocity at which the turbine is self-sustaining and which does not output torque when the rotor is rotating at a velocity at least as great as the self-sustaining speed without control from an external source; a permanent magnet generator (52) coupled to the output for generating electrical power in response to the rotation of the rotor; and an ignition system (16) powered by the electrical power generated by the permanent magnet generator for producing ignition pulses coupled to a combustor within the turbine until the output of the clutch is disengaged from the input.

6 Claims, 2 Drawing Sheets

GAS TURBINE IGNITION SYSTEM

DESCRIPTION

1. Technical Field

The present invention relates to ignition systems for gas turbine engines.

2. Background Art

FIG. 1 illustrates a block diagram of a prior art ignition system for a gas turbine engine of the type used for propulsion or generation of auxiliary power, emergency power, or an integrated function of emergency and auxiliary power in airframes. Turbine ignition systems 10 of the type illustrated in FIG. 1 utilize a 28 volt battery to supply electrical excitation to an ignition system which generates high voltage sparks applied to a spark plug 20. The 28 volt battery 12 is connected to an ignition control 14 which supplies current to ignition system 16. The function of the ignition control 14 is to apply 28 volt current to the ignition system 16 from a time at which fuel is injected into combustor 18 up to the time at which the rotational velocity of the rotor of the turbine reaches a speed at which operation is self-sustaining. The ignition system 16 generates high voltage which is periodically applied to spark plug 20 which produces a spark across an electrical gap in the presence of fuel injected into the combustor 18 after the rotor has started to rotate in the turbine engine to a time at least when the rotor has reached the aforementioned self-sustaining velocity. The turbine ignition system 10 does not function to continue to periodically apply high voltage to the spark plug 20 during normal operation. This system has the disadvantage of requiring electrical wiring between the 28 volt battery 12 and the ignition control 14 and between the ignition control 14 and the ignition system 16. The ignition control 14 is part of the overall control for the gas turbine. The aforementioned electrical wiring must be protected against short circuits and high voltage produced by EMP or lightening strikes to prevent possible damage to the ignition control 14 or the ignition system 16 which would render the turbine ignition system 10 inoperative. Furthermore, the turbine ignition system 10 has the disadvantage that external power is required to be applied to the ignition system 16 which prevents the turbine from having so-called "black start" capability not permitting external electrical power to be a requirement of starting which is important in military applications. Additionally, the 28 volt battery 12 applies starting current to the electrical starter (not illustrated) at the same time it provides electrical power to the ignition system 16. As a consequence of the high current draw by the electrical starter, the potential of the 28 volt battery is dropped which reduces the energy level present at the ignition system 16 which reduces the spark repetition rate of the sparks produced by the spark plug 20. The ignition control 14 adds complexity to the overall design of the starting system. Finally, in cold weather applications where the efficiency of the battery is dropped, the voltage available to the. ignition system 16 can be reduced thereby reducing the repetition rate of the sparks produced by the spark plug 20 which can interfere with or prevent the starting of the combustor.

U.S. Pat. No. 2,613,499 discloses an ignition system in which the ignition system is under the same control as the starter motor. In the system of the '499 patent, the connection of the primary winding of the ignition coil to the battery is by means of a line connected to the line for the starter motor so that flow of current to the primary winding is subjected to control of the switch which controls the starter.

In the prior art, black start capability has been provided by DC current generated by a permanent magnet generator coupled to a power takeoff from the rotor of the turbine.

DISCLOSURE OF INVENTION

The present invention provides a simplified starting system for a gas turbine engine. With the invention, no external electrical excitation is required to be applied to the ignition system. A power takeoff from the turbine rotor is applied to a centrifugal clutch which functions to couple torque from the power takeoff to a permanent magnet generator until the rotor of the turbine reaches self-sustaining speed. From the point of starting of rotation until self-sustaining speed is reached, the permanent magnet generator applies electrical energy to an ignition system which produces periodic high voltage which is applied to a spark plug contained in a combustor of the turbine engine. When the turbine reaches self-sustaining speed, the clutch disconnects the application of torque from the power takeoff from the turbine rotor to the permanent magnet generator which removes the electrical energy from the ignition system thereby disabling the producing of sparks across the spark plug.

The present invention has advantages over the prior art of FIG. 1. In the first place, the ignition control 14 of the prior art is eliminated which eliminates the need to interface with the control of the turbine. No external electrical power is required to be applied to the ignition system of the present invention which provides "black start" capability. Additionally, as a consequence of the ignition system not drawing electrical power directly from the battery, the ignition system is not subject to reduced spark rate as a consequence of voltage drop caused by the starter drawing electrical current from the battery or from reduced efficiency consequent from cold weather conditions reducing the overall output voltage of the battery. Additionally, having a high repetition rate of sparks present at all times enhances starting capability even in a situation where there is poor atomization of the fuel injected into the combustor.

A gas turbine ignition system in accordance with the invention includes a power takeoff coupled to the turbine for providing rotary power upon rotation of a to the power takeoff and an output which outputs torque applied to the input when the rotor is rotating at a velocity less than a velocity at which the turbine is self-sustaining and which does not output torque when the rotor is rotating at a velocity at least as great as the self-sustaining speed without control from an external source; a permanent magnet generator coupled to the output for generating electrical energy in response to rotation of the rotor; and an ignition system powered by the electrical power generated by the permanent magnet generator for producing ignition pulses coupled to a combustor within the turbine. The clutch may be a centrifugal clutch. The centrifugal clutch comprises a plurality of weights pivotally mounted on the input with each weight having an inner arcuate surface; a plurality of springs, each spring engaging the input adjacent to a weight and engaging the weight to bias the inner arcuate surface radially inward with respect to an axis of rotation of the input and output into engagement with an outer arcuate surface of the output to transmit torque between the input and output when the rotor is rotating at a speed below the turbine being self-sustaining. Each spring may be a leaf spring having a first end engaging a pin mounted on the input, a second end engaging a pin carried by the weight offset from where the weight engages the spring and a point between the first and second ends engaging the weight to cause the spring to be bent to bias the weight radially inward. An annular plate is attached to the input having an inner surface which rotates freely with respect to an outer periphery of the output of the clutch and on which the weights are pivotally mounted.

BEST MODE FOR CARRYING OUT THE INVENTION

Figure 1:
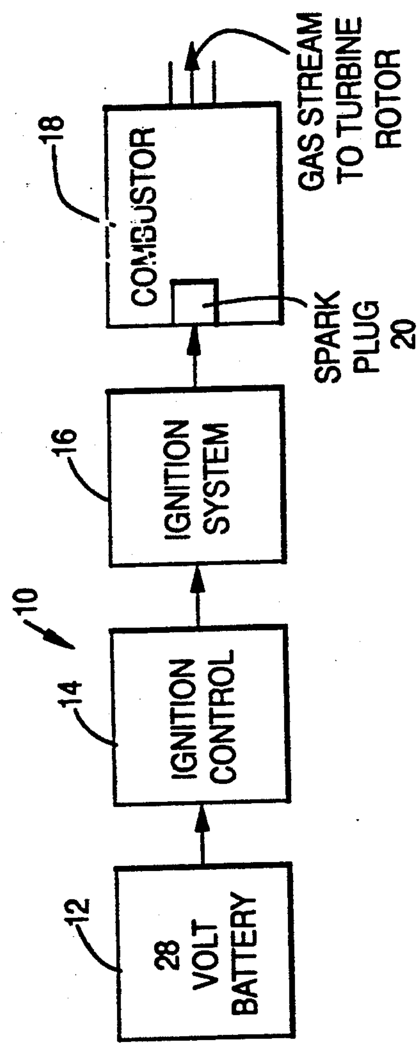
FIG. 1 illustrates a block diagram of a prior art ignition system for gas turbines.
Figure 2:
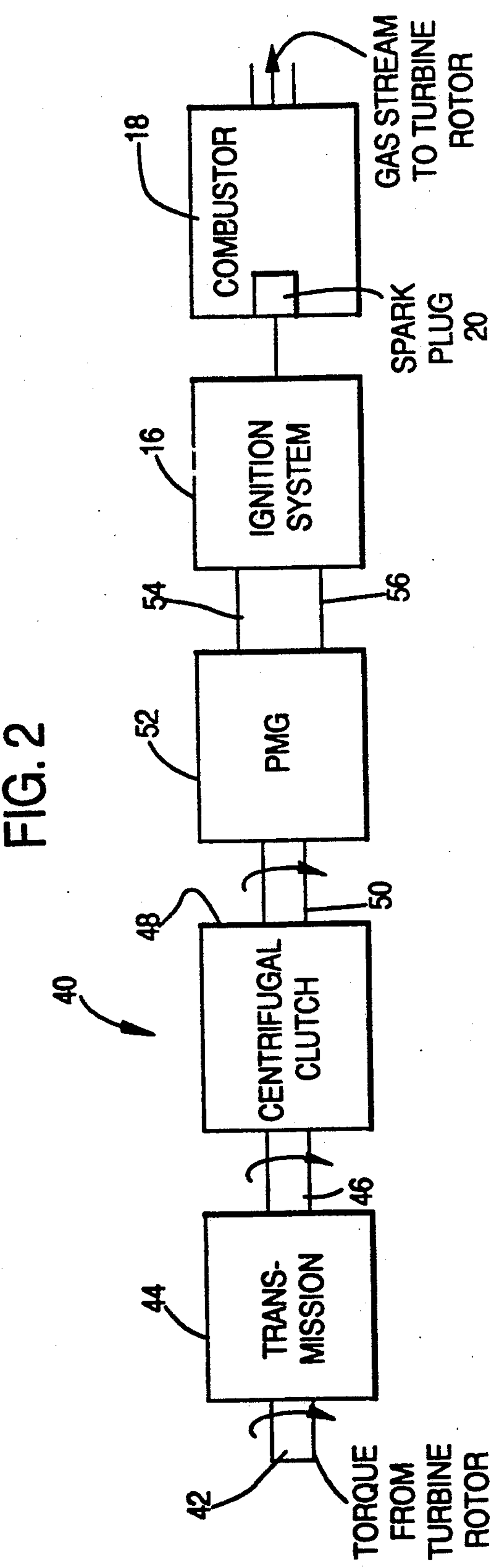
FIG. 2 illustrates a block diagram of an ignition system in accordance with the present invention.
Figure 3:
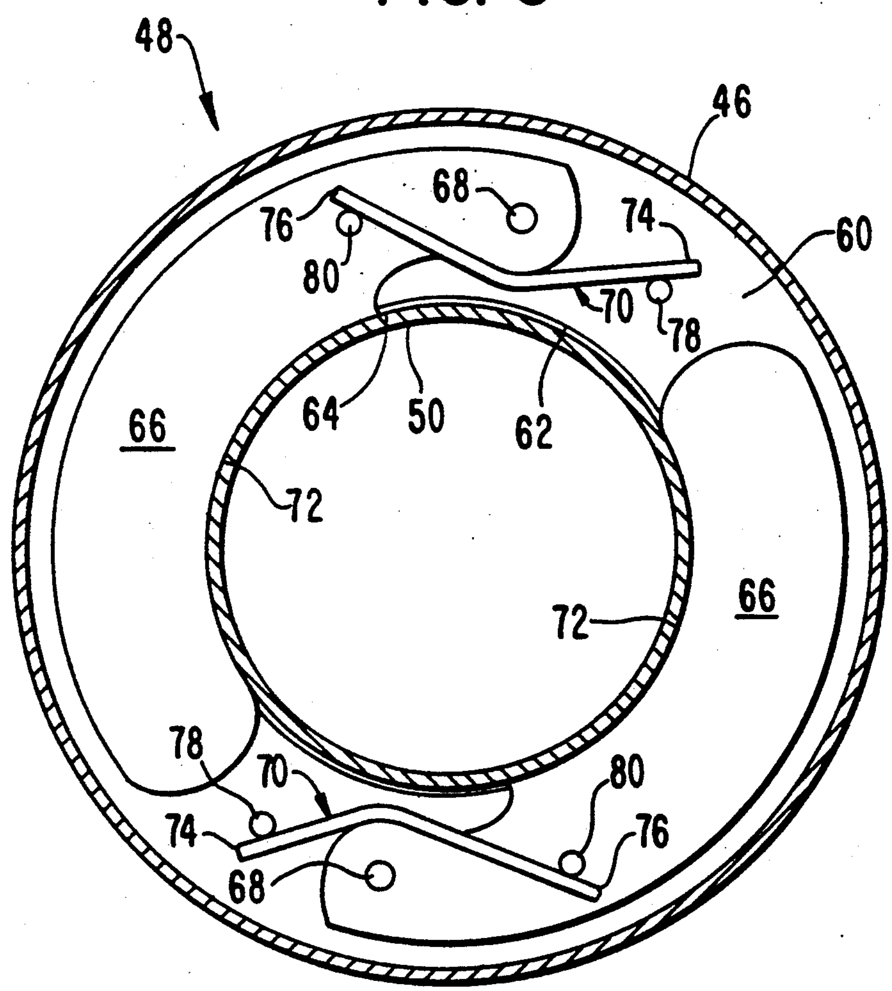
FIG. 3 illustrates a centrifugal clutch.

FIG. 2 illustrates an embodiment 40 of a turbine ignition system in accordance with the present invention. Like parts identify like elements in FIGS. 1 and 2. The turbine ignition system 40 of FIG. 2 differs from that of FIG. 1 in that there is no external electrical excitation necessary to apply current to the ignition system 16. A power takeoff 42 is coupled to the turbine rotor (not illustrated) which is an input to transmission 44. The transmission 44, which is a conventional part of turbine engine, produces a rotational velocity on output 46 which is different than the velocity of the input 42 through a gear train contained in the transmission. The output 46 drives a centrifugal clutch 48 which may be a drum type as illustrated in FIG. 3. The centrifugal clutch 48 produces a direct coupling on output 50 until the velocity of the turbine rotor is at least as great at the rotational velocity at which the turbine rotor produces sufficient torque to be self-sustaining. The output 50 drives a permanent magnet generator 52 which functions to generate electrical energy which is applied to ignition system 16 on output lines 54 and 56. The ignition system may be any ignition system which is excited by external electric current such as, but not limited to, an inductive or capacitive discharge ignition system.

FIG. 3 illustrates an embodiment of a suitable centrifugal clutch which may be utilized in the practice of the invention. Like reference numerals identify like parts in FIGS. 2 and 3. An annular disk 60 is attached to the driven member 46. The annular disk 60 has an inner periphery 62 which clears the outer periphery 64 of the driven member 50 so that there is no appreciable frictional drag between the disk 60 and the driven member. A plurality of weights 66 are pivotally attached to the annular disk 60 by pins 68. A plurality of leaf springs 70, which may be equal in number to the number of weights 66, biases the weights 66 inward so that the arcuate inner periphery 72 of the weights 66 frictionally engages the outer periphery 64 of the driven member 50. The springs 70 have first and second ends 74 and 76 which respectively engage a pin stop 78 mounted on the annular disk 60 and a pin stop 80 carried by the weight 66. In operation, the leaf springs 70 provide sufficient inward radial bias to the weights 66 to cause the inner arcuate surface 72 to frictionally engage the outer periphery 64 of the driven member 50 to complete a direct drive coupling between the drive member 46 and the driven member until the rotational velocity of the rotor of the turbine is at least as great at the self-sustaining speed. At a velocity equal to or greater than the self-sustaining speed of the turbine rotor at which the driven member 50 is intended to be disconnected from the drive member 46, the weights 66 are centrifugally rotated outward to overcome the inward bias of the springs 70 to remove the frictional coupling between the inner arcuate surface 72 and the outer periphery 64 of the driven member. The operation of the system is without the external control requirements of the prior art which add complexity and reduce reliability.

It should be noted that the present invention may be practiced with other types of clutches other than that illustrated in FIG. 3 which decouple drive without external control when a predetermined speed is reached. The embodiment of FIG. 3 is only exemplary of one possible type of centrifugal clutch which may be used in the practice of the present invention. The clutch may be any clutch which disengages at a predetermined increasing rotational velocity to deactivate the ignition system 16 and is not limited to being centrifugally activated.

While the invention has been described in terms of its preferred embodiment, it should be understood that numerous modifications may be made thereto without departing from the spirit and scope of the present invention as defined in the appended claims. It is scope of the appended claims.

I claim:

1. A gas turbine ignition system comprising:

a power takeoff coupled to the turbine for providing rotary power upon rotation of a rotor of the turbine;

a clutch having an input coupled to the power takeoff and an output which outputs torque applied to the input when the rotor is rotating at a velocity less than a velocity at which the turbine is self-sustaining and which does not output torque when the rotor is rotating at a velocity at least as great as the self-sustaining speed without control from an external source;

a permanent magnet generator coupled to the for generating electrical energy in response to rotation of the rotor; and an ignition system powered by the electrical energy generated by the permanent magnet generator for producing ignition pulses coupled to a combustor within the turbine until the output of the clutch is disengaged from the input.

2. A gas turbine ignition system in accordance with claim 1 wherein:

the clutch is a centrifugal clutch.

3. A gas turbine ignition system as in claim 2 wherein the centrifugal clutch comprises:

a plurality of weights pivotally mounted on the input with each weight having an inner arcuate surface;

a plurality of springs mounted on the input, each spring engaging the input adjacent to a weight and engaging the weight to bias the inner arcuate surface radially inward with respect to an axis of rotation of the input and output into engagement with an outer arcuate surface of the output to transmit torque between the input and output when the rotor is rotating at a speed below the turbine being self-sustaining.

4. A gas turbine ignition system as in claim 3 wherein:

each spring is a leaf spring having a first end engaging a pin mounted on the input, a second end engaging a pin carried by the weight offset from the weight engaging the spring and a point between the first and second ends engaging the weight to cause the leaf spring to be bent to bias the weight radially inward.

5. A gas turbine ignition system in accordance with claim 3 wherein:

an annular plate is attached to the input having an inner surface which rotates freely with respect to an outer periphery of the output of the clutch and on which the weights are pivotally mounted.

6. A gas turbine ignition system in accordance with claim 4 wherein:

an annular plate is attached to the input having an inner surface which rotates freely with respect to an outer periphery of the output of the clutch and on which the weights are pivotally mounted.

* * * * *